(12) United States Patent
Zhou et al.

(10) Patent No.: US 9,055,119 B2
(45) Date of Patent: Jun. 9, 2015

(54) METHOD AND SYSTEM FOR VM-GRANULAR SSD/FLASH CACHE LIVE MIGRATION

(71) Applicant: VMware, Inc., Palo Alto, CA (US)

(72) Inventors: Li Zhou, Palo Alto, CA (US); Samdeep Nayak, Sunnyvale, CA (US); Sandeep Uttamchandani, Palo Alto, CA (US); Sanjay Acharya, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 221 days.

(21) Appl. No.: 13/850,985

(22) Filed: Mar. 26, 2013

(65) Prior Publication Data

US 2014/0297780 A1    Oct. 2, 2014

(51) Int. Cl.
G06F 15/167     (2006.01)
H04L 29/08      (2006.01)

(52) U.S. Cl.
CPC .................................. *H04L 67/2847* (2013.01)

(58) Field of Classification Search
None
See application file for complete search history.

(56) References Cited

U.S. PATENT DOCUMENTS

| | | | |
|---|---|---|---|
| 6,075,938 A | 6/2000 | Bugnion et al. | |
| 8,261,267 B2 | 9/2012 | Iwamatsu et al. | |
| 2002/0129274 A1* | 9/2002 | Baskey et al. | 713/201 |
| 2003/0037089 A1 | 2/2003 | Cota-Robles et al. | |
| 2007/0005934 A1* | 1/2007 | Rotithor et al. | 711/213 |
| 2007/0156845 A1* | 7/2007 | Devanneaux et al. | 709/217 |
| 2008/0098194 A1 | 4/2008 | Hashimoto et al. | |
| 2010/0229168 A1 | 9/2010 | Maeda et al. | |
| 2010/0235836 A1 | 9/2010 | Bratanov | |
| 2011/0202728 A1 | 8/2011 | Nichols et al. | |
| 2011/0307889 A1* | 12/2011 | Moriki et al. | 718/1 |
| 2012/0030406 A1 | 2/2012 | Chang et al. | |
| 2012/0180043 A1* | 7/2012 | Tsirkin et al. | 718/1 |
| 2012/0210068 A1 | 8/2012 | Joshi et al. | |
| 2013/0104125 A1* | 4/2013 | Sarma et al. | 718/1 |
| 2013/0132674 A1* | 5/2013 | Sundrani | 711/122 |
| 2014/0052892 A1* | 2/2014 | Klein et al. | 711/103 |
| 2014/0080479 A1* | 3/2014 | Vangala et al. | 455/424 |

OTHER PUBLICATIONS

Luo et al., "S-CAVE: Effective SSD Caching to Improve Virtual Machine Storage Performance," Proceedings of the 22nd international conference on Parallel architectures and compilation techniques, PaCT '13, 2013, pp. 103-112, IEEE, USA.

(Continued)

*Primary Examiner* — Melvin H. Pollack
*Assistant Examiner* — Oluwatosin Gidado (57) ABSTRACT

The instant disclosure describes embodiments of a system and method for migrating virtual machine (VM)-specific content cached in a solid state drive (SSD) attached to an original host. During operation, the original host receives event indicating an upcoming migration of a VM to a destination host. In response, the original host transmits a set of metadata associated with the SSD cache to the destination host. The metadata indicates a number of data blocks stored in the SSD cache, thereby allowing the destination host to pre-fetch data blocks specified in the metadata from a storage shared by the original host and the destination host. Subsequently, the original host receives a power-off event for the VM, and transmits a dirty block list to the destination. The dirty block list specifies one or more data blocks that have changed since the transmission of the metadata.

20 Claims, 6 Drawing Sheets

(56) References Cited

OTHER PUBLICATIONS

Luo et al, "S-CAVE: Effective SSD Caching to Improve Virtual Machine Storage Performance," Proceedings of the 22nd International Conference on Parallel Architectures and Compilation Techniques, PaCT'2013, 2013, pp. 103-112, IEEE, USA.

* cited by examiner

METHOD AND SYSTEM FOR VM-GRANULAR SSD/FLASH CACHE LIVE MIGRATION

RELATED APPLICATION

The present application is related to U.S. patent application Ser. No. 13/658,567, entitled "METHOD AND SYSTEM FOR VM-GRANULAR I/O CACHING," by inventors Li Zhou, Samdeep Nayak, and Sandeep Uttamchandani, filed 23 Oct. 2012, which is incorporated by reference in its entirety herein.

BACKGROUND

Flash memory is a non-volatile storage chip that is electrically erasable and programmable. Negated AND (NAND) type flash memories exist in a wide range of portable storage devices, such as memory cards and USB drives. In recent years, the cost of NAND flash has dropped enough to make solid state drives (SSD) a viable option as primary storage devices for computer systems, often as a replacement for conventional hard disks.

Compared with traditional hard disks, flash/SSD devices (hereinafter, also generally referred to as an "SSD" device) have superior I/O performance. In addition, the cost of SSD devices has been continuously decreasing. These two factors make it increasingly popular to use SSD devices as a "second-level" cache which resides between the main memory (e.g., RAM) and a primary persistent storage such as a hard disk (as opposed to "first-level" or buffer cache which needs to utilize a portion of the main memory). Such a "second level" cache can be used by an operating system to cache "hot" I/O blocks (e.g., I/O blocks that may be frequently accessed) to improve I/O latency and throughput. Typically, such second-level caching involves a filter driver in the OS kernel I/O stack, which can intercept all I/Os, identify hot blocks, and dispatch I/Os to a cache or persistent storage.

In a virtualized environment, however, using a SSD device as a second-level cache brings up new challenges. For example, because a host computer system (e.g., a "host") supports the running of multiple virtual machines (VMs) in a virtualization environment, the host computer system would need to manage the second-level cache on a per-VM basis and maintain VM-specific caching policies. In addition, VM live migration, also referred to as "VMotion," is a technology that enables moving running VMs between different hosts without service interruption, and with complete transaction integrity. During VMotion, the hypervisor moves a VM's memory to the new host over a network connection (such as Ethernet) first, and then quickly suspends the VM on the original host an resumes it on the new host. It is often critical to keep the migration latency low in order to guarantee continuous service availability for VMotion. When a host uses an SSD device as a second-level cache, how to take advantage of the SSD cache during VMotion presents a challenging problem.

SUMMARY

The instant disclosure describes embodiments of a system and method for migrating virtual machine (VM)-specific content cached in a solid state drive (SSD) attached to an original host. During operation, the original host receives event indicating an upcoming migration of a VM to a destination host. In response, the original host transmits a set of metadata associated with the SSD cache to the destination host. The metadata indicates a number of data blocks stored in the SSD cache, thereby allowing the destination host to pre-fetch data blocks specified in the metadata from a storage shared by the original host and the destination host. Subsequently, the original host receives a power-off event for the VM, and transmits a dirty block list to the destination. The dirty block list specifies one or more data blocks that have changed since the transmission of the metadata.

In a variation on this embodiment, the original host maintains the dirty block list subsequent to transmitting the metadata associated with the SSD cache.

In a variation on this embodiment, the original host suspends the transmission of the metadata associated with the SSD cache in response to receiving the power-off event for the VM.

In a further variation, the original host resumes transmission of the metadata associated with the SSD subsequent to transmitting the dirty block list.

In a further embodiment, during operation, the destination host receives an event indicating an upcoming migration of a VM to a destination host. The destination host then receives a set of metadata associated with the SSD cache from the original host. In response, the destination host pre-fetches data blocks specified in the metadata from a storage shared by the original host and the destination host, and stores the pre-fetched data blocks in an SSD cache attached to the destination host.

In a variation on this embodiment, the destination host receives a power-on event for the VM at the destination host. In response to the power-on event, the destination host receives a dirty block list from the original host, wherein the dirty block list indicate a number of blocks that have changed on the SSD cache attached to the original host. Next, the destination host invalidates one or more pre-fetched blocks based on the dirty block list.

In a further variation, subsequent to invalidating the one or more pre-fetched blocks, the destination host places the SSD cache attached to the destination host in service for the newly migrated VM.

In a further variation, subsequent to receiving the dirty block list, the destination host resumes the receiving of the metadata from the original host.

In a variation on this embodiment, the destination host receives multiple sets of SSD cache metadata which are associated with a number of migrating VMs, and pre-fetches data blocks specified by the multiple sets of SSD cache metadata based on each set of metadata's corresponding cache hit rate.

In a variation on this embodiment, the destination host discontinues pre-fetching the data blocks in response to a timeout event or a size limit being reached.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Certain embodiments described herein facilitate live migration of a VM-granular, SSD-based, "second-level" I/O cache by transmitting, upon a VM's VMotion, a set of metadata of the SSD cache on the original host to the destination host. This metadata indicates main storage blocks for the VM (e.g., a disk provided at a storage array and accessible via a high-speed network connection, such as Fibre Channel (FC)). Based on this metadata, the destination host can pre-fetch these blocks and populate its local SSD cache. Essentially, the content of the SSD cache does not migrate from the original host to the destination host. Instead, the destination host obtains the content (or a portion thereof) from the main storage disk, taking advantage of the high speed links between the destination host and the disk, which can be significantly faster than the network link between the original host and the destination host.

Figure 1:
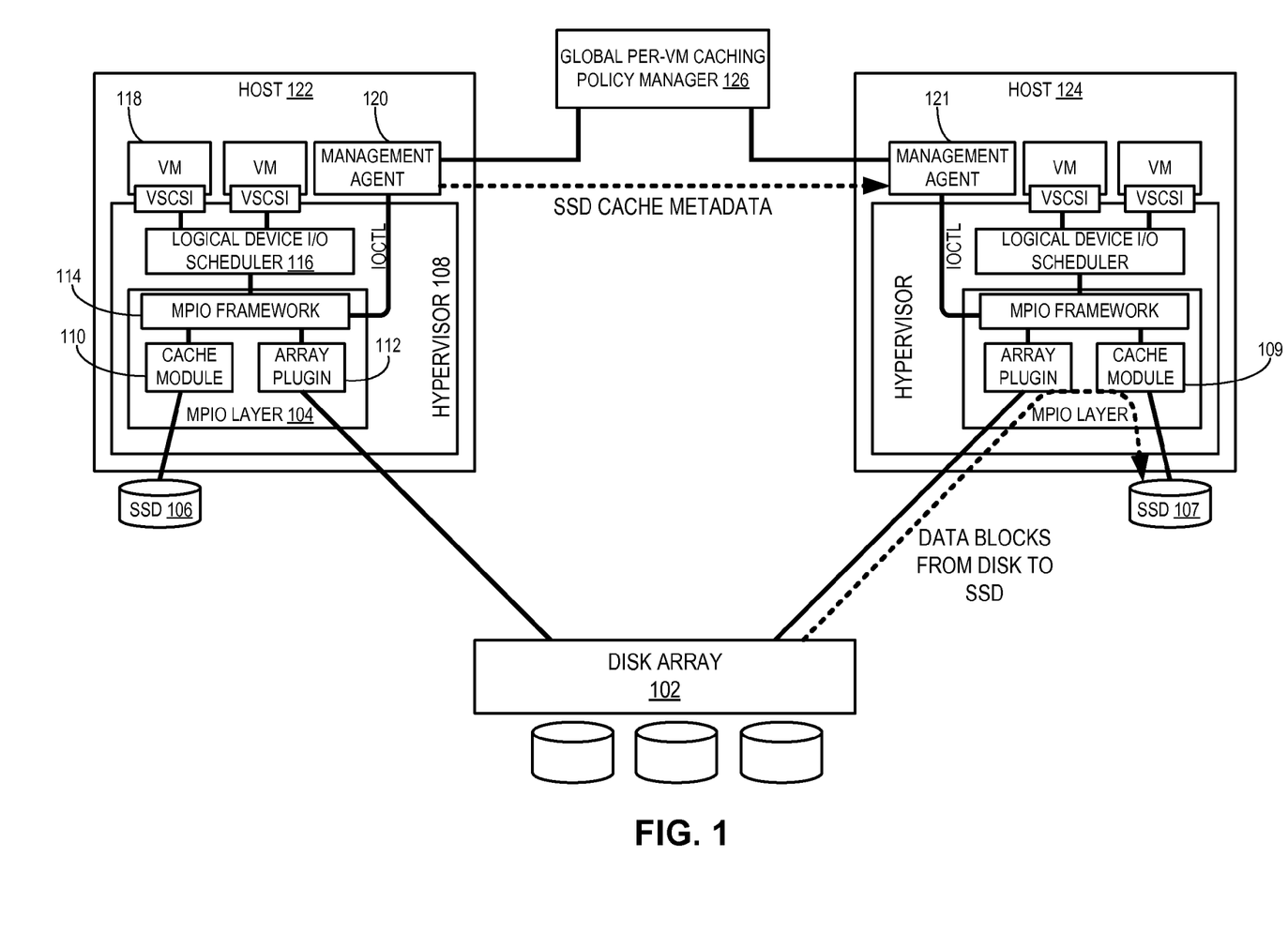
FIG. 1 illustrates an exemplary system architecture of a virtualized data center which supports live migration of a VM-granular second-level I/O cache, in accordance with one embodiment.

FIG. 1 illustrates an exemplary system architecture of a virtualized data center which supports live migration of a VM-granular second-level I/O cache, in accordance with one embodiment. The system architecture of FIG. 1 introduces at least three components to the virtualized data center: (i) a global caching policy manager 126, which, for example, may be functionality that is embedded (e.g., as a "plug-in") into a more general VM data center management platform, such as vCenter Server from VMware, Inc. ("VMware"), (ii) a cache module 110 that is embedded into an I/O stack of a hypervisor 108 of each host 122 and 124, serves as a communication channel with an SSD device 106 (or SSD devices) installed in each of hosts 122 and 124, respectively, and manages SSD device 106 as a "transparent" cache for VMs (e.g., unknown to the VMs themselves) running on the hosts, and (iii) management agent 120 running (e.g., running in "user world," as discussed above) on each of hosts 122 and 124 that serves as a communication intermediary between global caching policy manager 126 and cache module 110.

Global caching policy manager 126 maintains VM-specific caching policies such that the policies are accessible to a number of hosts in a data center or managed cluster (e.g., such as the 2 host cluster comprising hosts 122 and 124). By maintaining a VM's caching policy in global caching policy manager 126, such a VM can be migrated (e.g., via live migration technologies in certain embodiments, such as VMware's VMotion migration technology) from one host to another host while ensuring that the host to which the VM will be migrated can comply with the VM's caching policy once it is migrated. For example, hypervisor 108 on host 122 may be requested (e.g., by a VM data center management platform such as vCenter Server) to run a VM 118, upon which, management agent 120 on host 122 may receive a notification from hypervisor 108 (e.g., by registering with hypervisor 108 to request notification of certain VM related events, such as VM startup, migration, shutdown and the like) of the intention to start VM 118, and accordingly communicates with global policy manager 126 to obtain the caching policy for VM 118. Management agent 120 may communicate such a caching policy to cache module 110 to determine whether SSD 106 of host 122 can support such a cache requirement. In one embodiment, the communication channel between management agent 120 and cache module 110 may be implemented as I/O control ("IOCTL") system calls by management agent 120 into hypervisor 108. If cache module 110 determines that SSD device 106 of host 122 can support the caching policy of VM 118, then cache module 110 may allocate a portion of SSD device 106 to be used as a cache for VM 118 when VM 118, for example, performs I/O in order to read or write data to a virtual disk file that resides in a shared disk array 102. Similar to allocating space in SSD device 106 to startup VM 118 on host 122, cache module 110 also deallocates or otherwise invalidates "stale" cache or space in SSD device 106, for example, when a VM is shutdown or migrated to a different host (or for any other cache management purposes, such as cache time-outs, full cache space, and the like). In one embodiment, when a VM data center management platform such as vCenter Server instructs hypervisor 108 to shutdown VM 118 or migrate VM 118 to host 124, hypervisor 108 transmits a corresponding notification to management agent 120, which, in turn, communicates with cache module 110 (via IOCTL) to invalidate or deallocate that portion of SSD device 106 which had been allocated to VM 118. In an alternative embodiment, global caching policy manager, as part of a VM data center management platform such as vCenter Server, may directly communicate an intention to shutdown or migrate VM 118 to management agent 120 in host 122, which, in turn communicates the intention to cache module 110.

In addition to allocating and invalidating cache space in SSD device 106, cache module 110 also facilitates the per-VM caching of data in SSD device 106 when VMs are performing I/O. In certain embodiments that utilize a system architecture similar to that of FIG. 1, cache module 110 is implemented within a multi-pathing (MPIO) layer 104 of hypervisor 108. As depicted in FIG. 1, MPIO layer 104 sits within an I/O stack of hypervisor 108 that includes (i) a virtual SCSI (vSCSI) layer that, for example, presents to the guest OS of VM 118 a virtual disk file stored in a file system in disk array 102 as a logical storage device (e.g., SCSI block device), and (ii) a logical device I/O scheduler 116 that schedules block I/O to the logical storage devices for the VMs running in a hypervisor and, for example, enforces the fair sharing of logical storage devices between VMs.

MPIO layer 104 receives block I/Os from logical device I/O scheduler 116 and, to increase fault tolerance and enhance I/O performance, appropriately selects one of a multiple of paths (e.g., one port of a number of available ports in a number of host bus adapters in host 122 that can route I/O to disk array 102, etc.) from host 122 to disk array 102 to route I/O. The particular embodiment of MPIO layer 104 of FIG. 1 further implements an MPIO framework 114 that enables third party disk array vendors (e.g., such as the third party vendor of disk array 102) to provide "plug-in" modules, such as array plugin 112, that can be dynamically loaded into MPIO layer 104 in order to dispatch I/Os received by MPIO framework 115 to, for example, disk array 102 along a selected path and in accordance proprietary policies and techniques of the vendor. In such an embodiment, cache module 110 can also be inserted as a "plug-in" supported by MPIO framework 114. However, as further discussed below, cache module 110 selectively routes block I/Os received from MPIO framework 115 to SSD 106 instead of disk array 102, utilizing SSD 106 as a local "second level" cache.

Cache module 110 manages SSD device 106 as a cache to VMs running on host 122 on a "per VM" basis. In order to perform caching of I/O on a per-VM basis, cache module 110 associates block I/O requests that it receives from the I/O stack of hypervisor 108 with the particular VMs that are performing such I/O requests. In one embodiment, cache module 110 obtains a unique identifier for VM 118 from management agent 120 which, for example, receives the unique identifier of the VM upon receipt of a VM startup notification, as previously discussed. In certain of such embodiments, such a unique identifier may be a "universally unique identifier" (UUID) that, for example, is based on an identifier of the physical host in which a VM has been instantiated and a pathname of the location of the VM's configuration file (e.g. a .vmx file in certain VMware technology based embodiments) that is stored in shared disk array 102. Cache module 110 may associate a VM's allocated cache space in SSD device 106 with this unique identifier.

Management agent 120 may be further configured to request and receive from hypervisor 108 (e.g., upon receiving a VM start notification, etc.) the identifiers or IDs of all processes associated with a VM running on hypervisor 108. For example, in certain embodiments, such as embodiments using VMware's vSphere Hypervisor as hypervisor 108, hypervisor 108 spawns a separate process or thread for each virtual CPU (vCPU) of a running VM—the process ID (PID) of each such vCPU process is sometimes referred to as a "vCPU ID" or "world ID." In one embodiment, such as an embodiment using VMware's vSphere virtualization technologies, management agent 120 is able to obtain the vCPU IDs corresponding to a VM through an API provided by hypervisor 108 (e.g., in vSphere, referred to as the VMkernel Sysinfo Interface or VSI) and forward the vCPU IDs to cache module 110 in association with the VM's unique identifier. Cache module 110 then maintains a mapping between the unique identifier of the VM (which also identifies the area of SSD device 106) which serves as a cache for such VM and the PIDs or vCPU IDs of the vCPU processes running in the VM. When a VM transmits an I/O read or write request, the PID or vCPU ID of the VM's vCPU that is requesting the I/O is also passed through the various layers of the I/O stack of hypervisor 108, along with the I/O request itself, such that an I/O response can be ultimately be returned to the requesting PID or vCPU ID. As such, when the I/O request reaches cache module 110, which is embedded in the I/O stack of hypervisor 108, cache module 110 is able obtain the PID or vCPU ID associated with the I/O request and map it to the unique identifier of the VM. In doing so, cache module 110 is thus able to access the cache in SSD device 106 that is associated with the unique identify of the VM to see if the I/O request can be handled by the cache.

In virtualized data centers, VMs can move automatically between physical hosts, enabled by technologies like VMotion. When a VM migrates to a different host, there are two approaches to handle the local SSD cache on the original host: (1) discard the cache data on the original host; or (2) migrate the cache data from the original host to the destination host. The first approach simplifies design and adds little extra latency to the VMotion process. However, the tradeoff is that SSD cache "re-warm" is necessary after the VM migration. That is, the SSD cache on the destination host will need to fetch the content based on new I/O access by the migrated VM. For a large SSD cache, it could take a long time to re-warm the SSD cache, which can reduce I/O performance for the migrated VM. Particularly, in the case of a virtualized data center adopting dynamic VM migration based on resource availability, where VMs are moved automatically to hosts with more resources in order to improve VM's performance, I/O performance degradation after VMotion could confuse the management system and cause unexpected consequences.

Hence, it is more desirable to migrate the SSD cache content along with the VM during VMotion to avoid temporary performance degradation. Ideally, the SSD cache content migration should incur minimal latency, because VMotion typically demands very low latency so that the end users will not notice any interruption of service. However, a low-latency migration of SSD cache is not a trivial task because traditionally VMotion only moves the VM's memory, which is only a fraction of the size of the VM's SSD cache. How to move such a big amount of data without causing noticeable latency to VMotion presents a challenge. Since a VM needs to continue its operation during the process of live migration, new WRITEs could be issued to the virtual disk during this process. How to guarantee data integrity is another challenge. Furthermore, when there are multiple VMs migrating simultaneously to the same destination host, it is important that the destination host can properly schedule the transfer of the cached blocks to minimize the impact on I/O performance of the migrated VMs.

During VMotion, the original host and destination host transfers the VM memory over a VMotion network, which is typically a Gigabit Ethernet link. Since the size of a VM's SSD cache is much larger than its memory size, it would take a long time to transfer the image of the VM's SSD cache over the VMotion network. In addition, such cache image transfer would compete with VMotion traffic for bandwidth, which could potentially cause VMotion to fail due to timeout.

Since the actual data blocks are already available on the main storage disk, which is accessible via high-speed I/O channels from both the original host and destination host, embodiments of the system described herein address the aforementioned challenges by transferring only the SSD cache metadata over the VMotion network. Based on the transferred metadata, the destination host can rebuild the SSD cache locally by pre-fetching the data blocks from the main storage disk into the local SSD cache through the fast I/O channel, instead of obtaining the image of the SSD cache from the original host over a conventional network connection. The benefit of doing so is that the cached content transfers from the main storage disk to the destination host's over a data link (e.g., a FC link, which ca) that is much faster than a conventional Ethernet link.

With reference to the example illustrated in FIG. 1, assume that VM 118 is to migrate from host 122 to host 124. First, host 124 creates a shadow VM. Next, host 122 copies each memory page of VM 118 to host 124 via a VMotion network, a process known as "preCopy." After the first round of preCopy, host 122 performs another pass over VM 188's memory and copies any page that has changed since the last round of preCopy. Host 122 continues this iterative memory copying process until there is no changed page left since the previous round of preCopy. Subsequently, a VMotion manager powers off, or "stuns," VM 118 on host 122, and resumes the shadow VM on host 124, which uses the copied memory pages of VM 118. Consequently, VM 118 resumes operation on host 124.

To locally rebuild the SSD cache image for VM 118 on host 124, when the first round of preCopy occurs, cache module 110 provides the metadata to management agent 120 through IOCTL. In one embodiment, the SSD cache metadata can indicate VM 118's identity (e.g., VM 118's UUID), the total number of cached blocks for VM 118 in SSD 106, and the identities of each cached block. Subsequently, management agent 120 transmits a copy of the SSD cache metadata to management agent 121 on host 124. As management agent 121 receives the metadata, management agent 121 forwards the metadata to cache module 109, which can start pre-fetching data blocks indicated in the metadata from disk array 102. Cache module 109 may pre-fetch the blocks by issuing READs to disk array 102, and optionally coalesce the READs to big blocks when possible to improve I/O performance. Note that the pre-fetching can start before the transmission of metadata is complete, and well before VM 118 is stunned.

The pre-fetching process on host 124 can occur simultaneously as the preCopy process on host 122. Since VM 118 is still running during the preCopy process, it is possible that VM 118 might issue WRITE commands to some of the blocks previously cached in SSD 106. Since SSD 106 is a read-only cache, these WRITE commands result in updated data blocks in disk array 102 as well as SSD 106. Because the update to the data blocks occur after the transmission of the SSD cache metadata, if host 124 has already pre-fetched such data blocks into SSD 107, these blocks are no longer valid in SSD 108. To resolve this problem, cache module 110 maintains a list of "dirty blocks," which are data blocks that have been updated after host 112 has started transmitting the SSD cache metadata. After the preCopy process is complete for VM 118, and when VM 118 is stunned, management agent 120 temporarily suspends the transmission of the SSD cache metadata if such transmission is not complete yet, and transmits this dirty block list to management agent 121. Upon receiving the dirty block list, management agent 121 instructs cache module 109 to invalidate any pre-fetched block in SSD 107 that is on the dirty block list. At approximately the same time, VM 118 restarts on host 124, and the corresponding cache in SSD 107 makes all the pre-fetched blocks available for caching service for VM 118. Subsequently, transmission of the rest of SSD cache metadata (if any) resumes, and cache module 109 continues to pre-fetch the rest of the blocks specified in the SSD cache metadata and the dirty block list.

Figure 2A:
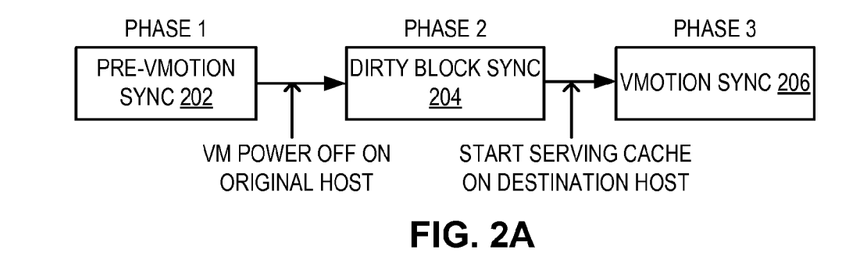
FIG. 2A presents a flowchart illustrating the process of migrating a VM-granular second-level I/O cache, in accordance with one embodiment.

In general, the VM-granular SSD cache migration includes three phases, as illustrated in FIG. 2A. During phase 1, the original host enters into a pre-VMotion synchronization phase (operation 202), which occurs at the same time as the preCopy process on the original host. The original host begins transmitting the SSD cache data to the destination host. The destination host can start pre-fetching blocks specified in the SSD cache metadata as soon as the metadata starts arriving at the destination host.

Phase 2 begins when the preCopy process is complete and when the VM on the original host is stunned. During phase 2, the original host and destination host synchronize the dirty blocks, which are the blocks that have been written to by the migrating VM during phase 1 (operation 204). The destination host invalidates pre-fetched blocks that are on the dirty block list. At the same time, the destination host powers on the migrated VM.

After the destination host synchronizes all the dirty blocks, which is a short process since the dirty block list typically is a small file, the SSD cache on the destination host starts serving cache to the migrated VM. Subsequently, the destination host enters into phase 3, during which the SSD cache resumes pre-fetching blocks specified in the received SSD cache metadata as well as the dirty block list (operation 206).

Figure 2B:
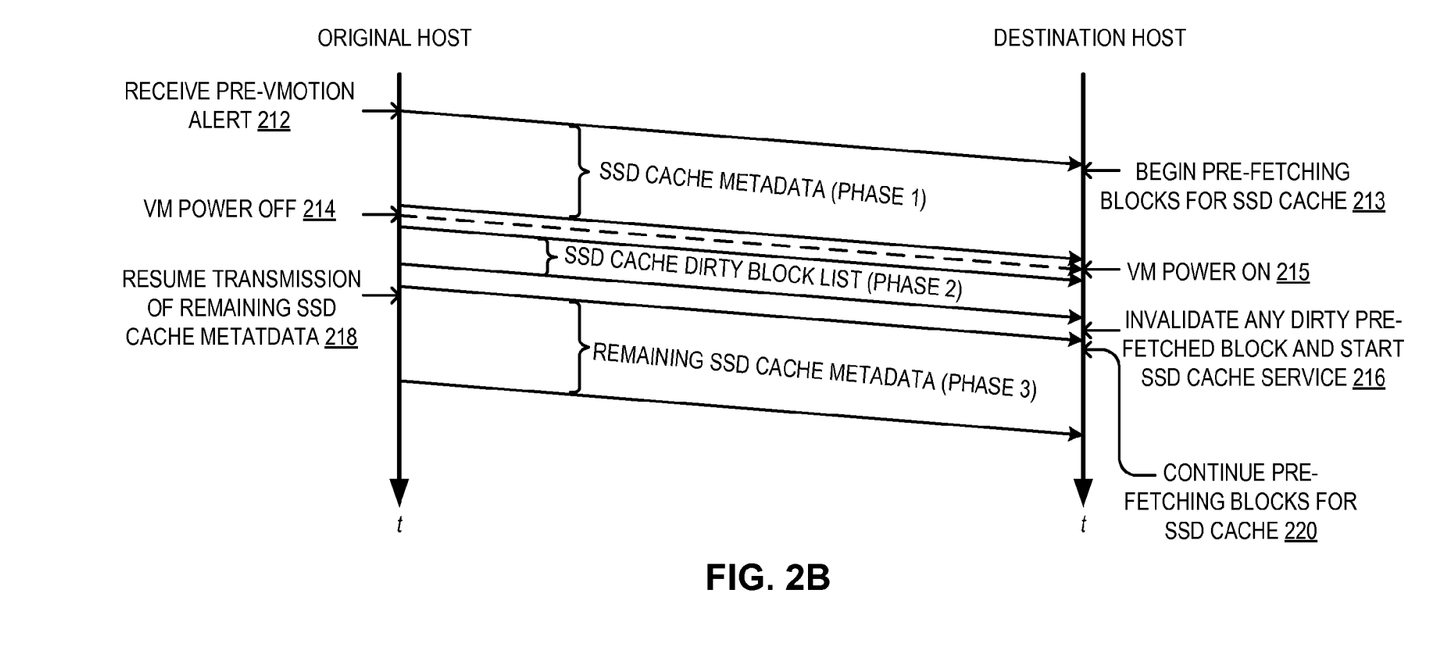
FIG. 2B presents a time-space diagram illustrating the process of migrating a VM-granular second-level I/O cache, in accordance with one embodiment.

FIG. 2B presents a time-space diagram illustrating the process of migrating a VM-granular second-level I/O cache, in accordance with one embodiment. During operation, cache module 110 on the original host 122 first receives a pre-VMotion alert for VM 118 (operation 212). In response, cache module 110 provides VM 118's SSD cache metadata to management agent 120, which transmits the metadata to management agent 121 on destination host 124 (phase 1). Cache module 109 can immediately start pre-fetching the blocks from disk array 102 for SSD cache 107 (operation 213).

Figure 3A:
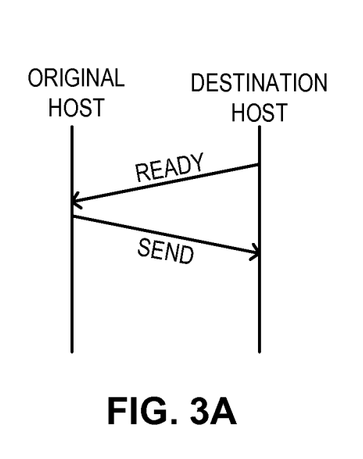
FIGS. 3A, 3B, and 3C present different communication scenarios during the transfer of metadata for a second-level I/O cache between an original host and a destination host, in accordance with one embodiment.
Figure 3B:
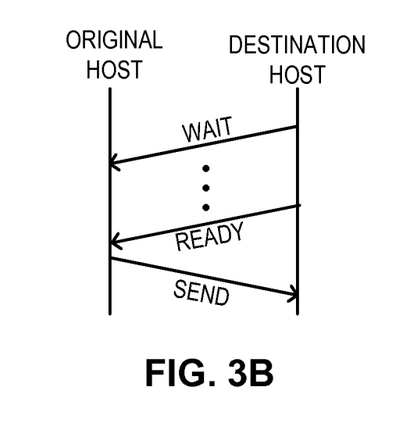
Figure 3C:
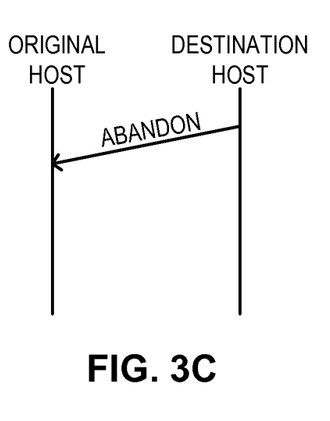

In one embodiment, management agent 120 only sends the metadata to management agent 121 after management agent 121 notifies management agent 120 that it is ready, as illustrated in FIG. 3A. As illustrated in FIG. 3B, if management agent 121 is not ready, management agent 121 can send management agent 120 a "wait" signal, in response to which management agent 120 temporarily suspends transmission of the metadata. When management agent 121 is ready to receive more metadata, management agent 121 sends a "ready" signal to management agent 120, upon which management agent 120 continues to transmit the metadata. As illustrated in FIG. 3C, when management agent 121 determines to abandon the metadata transmission (for example, due to timeout or a cache migration policy), management agent 121 sends an "abandon" signal to management agent 120. In response, management agent 120 terminates the transmission of metadata.

Referring back to FIG. 2B, note that VM 118 can issue new WRITEs between the beginning of the pre-VMotion process (operation 212) and VM power off (operation 214). In one embodiment, host 122 maintains a dirty block list which records the blocks updated by these new WRITEs. The existence of the dirty blocks means that host 124 cannot start serving the cached content immediately, even after VM 118 is resumed on host 124. Host 124 must wait until cache module 109 receives the list for all dirty blocks.

When VM 118 powers off on host 122 (operation 214), VM 118 will issue no more WRITEs to disk array 102, and there can be no more dirty blocks. At this point, cache module 110 can start transferring the metadata of the dirty blocks to host 124 (phase 2). If the original SSD cache data has not been completely transmitted to host 124, the transmission will be temporarily stopped. The reason for doing so is that host 124 cannot start using the cache unless the metadata for all dirty blocks are available. Therefore, as soon as VM 118 powers off on host 122 (operation 214), management agent 120 transfers the dirty block list to management agent 121. Meanwhile, VM 118 can start on host 124 before host 124 receives the dirty block list (operation 215).

Note that SSD cache 107 may not start serving the migrated VM 118 before cache module 109 receives the dirty block list. If a READ by VM 118 to a dirty block occurs on host 124, the MPIO framework on host 124 just passes the READ to disk array 102. In the mean time, cache module 109 continues to pre-fetch data blocks from disk array 102 to build up the cache.

After receiving the dirty block list, cache module 109 invalidates any dirty pre-fetched block in SSD 108, and starts the SSD cache service for the migrated VM 118 (operation 216). Meanwhile, host 122 resumes transmission of the remaining SSD cache metadata in phase 3 (operation 218). In addition, cache module 109 continues to traverse the SSD cache metadata and to pre-fetch blocks for the local SSD cache, until all blocks specified in the metadata are fetched, or until a timeout event occurs (operation 220).

The total size of the SSD cache for a high performance VM could reach hundreds of GBs. It would take many minutes to transfer such a big dataset even over multiple 8 Gb FC or 10 Gb FCoE connections. Moreover, when an original host is experiencing resource shortage, multiple VMs could be VMotioned to other hosts simultaneously, which further increases the total size of cache data to be migrated. In one embodiment, the cached blocks are migrated in order of priority to allow blocks with the highest cache hit rate to be available the earliest on the destination host. Therefore, when lower priority blocks are moved to the destination host, they might not be "hot" blocks anymore and should have already been evicted from the cache. Hence, it may be desirable to only move blocks with higher hit rate when the cache size surpasses a threshold, and to set a timeout to the cache migration process.

In some embodiments, a cache module can use the size limit and timeout value together to avoid moving low priority blocks unnecessarily. In one embodiment, the size limit can be 10× of the VM's memory size by default, and is tunable by user on a per VM basis. The timeout value can be set to for example 30 sec by default, and again is tunable on a per VM basis by user. The destination host will stop pre-fetching blocks from the disk when either the size limit is reached or timeout occurs.

A VM often has multiple virtual disks (VMDKs). Since the SSD cache provides caching services on a per VMDK basis, and each VMDK has a different cache hit rate on its cache, it is desirable to schedule the cache migration I/O (i.e., pre-fetching) based on a weight corresponding to the cache hit rate. This can also apply to the case where multiple VMs are VMotioned simultaneously to the same destination host. In some embodiments, the caching layer in the destination host does global I/O scheduling for cache migration, with a weight set on a per VMDK basis. The pre-fetching I/Os commands for VMDK with heavier weight receive higher priority and will be scheduled more frequently. In one embodiment, the weight is equal to the cache hit rate percentage value of the VMDK. For example, if a VMDK's cache hit rate is 30%, its weight can be set at 30. The I/O scheduler iterates among the VMDKs to-be-VMotioned, and does N (N=weight value) I/Os for the VMDK each round. Therefore the VMDK with higher hit rate gets more blocks pre-fetched each round. The number of blocks fetched from disk in each round is proportional to the hit rate. In one embodiment, the hit rate of a VM-granular SSD cache is stored as a part of the cache metadata.

Figure 4:
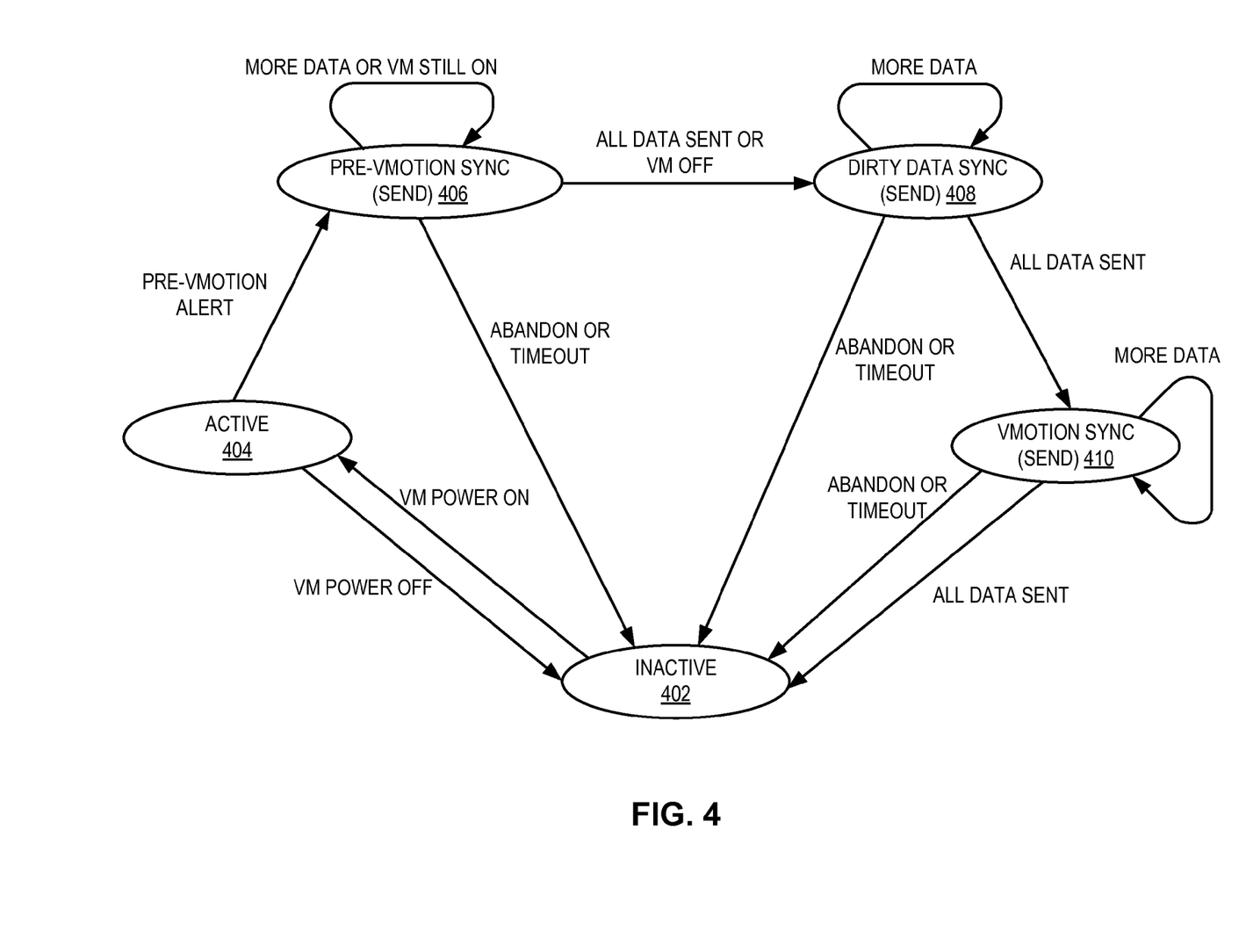
FIG. 4 presents a state diagram for an original host that supports live migration of a VM-granular second-level I/O cache, in accordance with one embodiment.

FIG. 4 presents a state diagram for an original host that supports live migration of a VM-granular second-level I/O cache, in accordance with one embodiment. During operation, assuming the VM at issue on the original host is initially powered off. Correspondingly, the caching management agent is in an inactive state 402. When the hypervisor on the original host receives a "VM POWER ON" signal, the management agent enters into an active state 404. Note that if the VM receives a "VM POWER OFF" signal the management agent will return to inactive state 402. While the management agent is in active state 404, if the hypervisor receives a pre-VMotion alert, the management agent enters a pre-VMotion synchronization state 406, in which the management agent transmits the VM's SSD cache metadata to the management agent in the destination host. If there is more metadata to transmit, or if the VM is still in a powered on state, the management agent continues to transmit the SSD cache metadata. If the management agent receives an "ABANDON" or "TIMEOUT" alert from the destination host, the management agent returns to inactive state 402. If all the data has been sent or the VM has been powered off (i.e., stunned), the management agent enters into a dirty data synchronization state 408, in which the management agent transmits to the destination host the dirty block list. If there is more data for the dirty block list to transmit, the management agent stays in state 408. If at this time the management agent receives an "ABANDON" or "TIMEOUT" alert from the destination host, the management agent returns to inactive state 402. Once all the data for the dirty block list is sent, the management agent enters a VMotion synchronization state 410 to resume transmission of any SSD cache metadata that has been left off when the management agent stopped to transmit the dirty block list in state 408. After all the data is sent, or in response to receiving an "ABANDON" or "TIMEOUT" alert, the management agent returns to inactive state 402.

Figure 5:
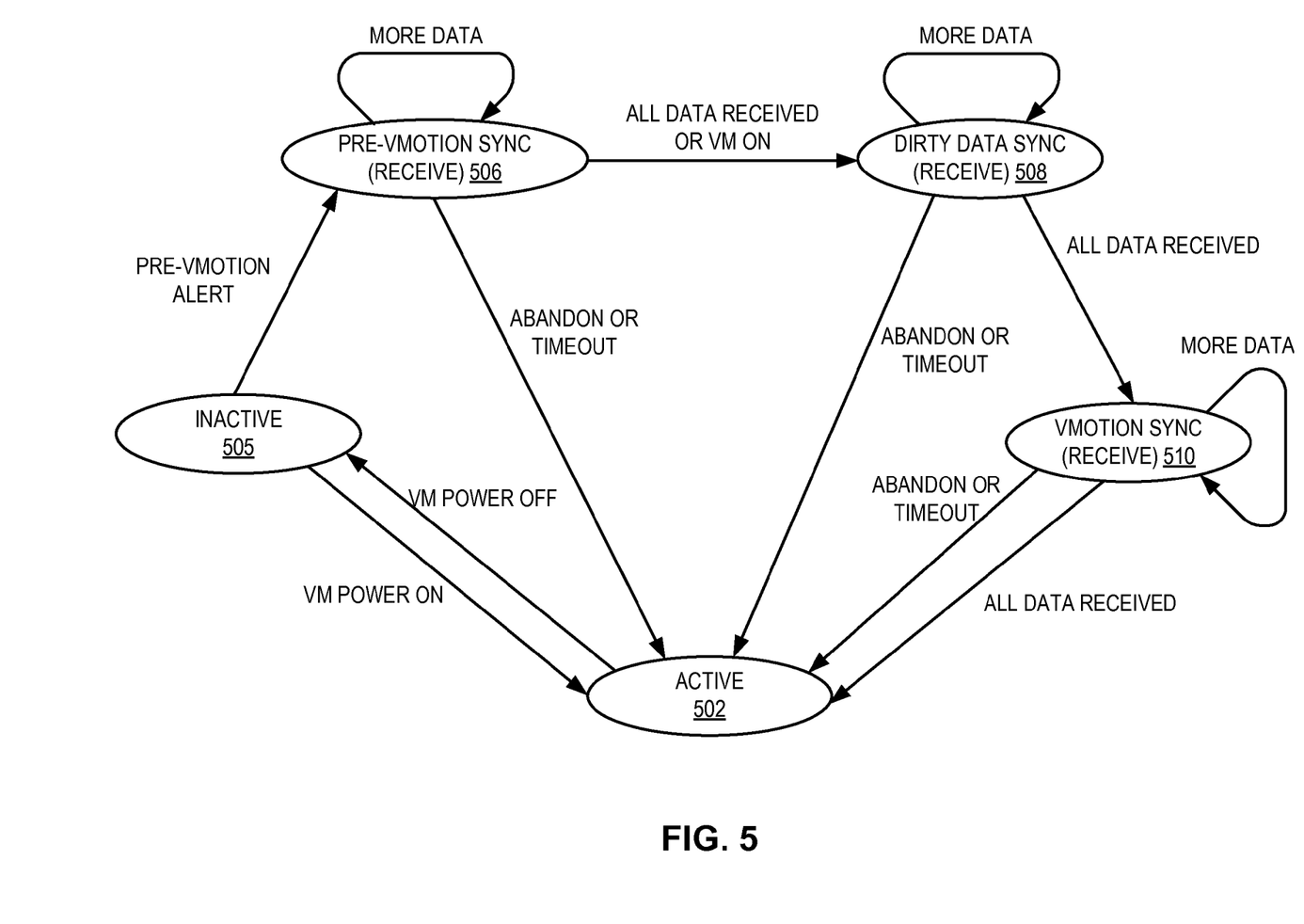
FIG. 5 presents a state diagram for a destination host that supports live migration of a VM-granular second-level I/O cache, in accordance with one embodiment.

FIG. 5 presents a state diagram for a destination host that supports live migration of a VM-granular second-level I/O cache, in accordance with one embodiment. During operation, assuming that the hypervisor on the destination host has created an image for the VM at issue and the VM is initially power off. Corresponding, the caching management agent is in an inactive state 505. When the hypervisor on the destination host receives a "VM POWER ON" signal when the VMotion is complete, the caching management agent enters into an active state 502. While in active state 502, the management agent can enter back into inactive state 505 if the hypervisor receives a "VM POWER OFF" signal. While the management agent is in inactive state 505, if the hypervisor receives a pre-VMotion alert, the management agent enters a pre-VMotion synchronization state 506, in which the management agent receives the VM's SSD cache metadata from the management agent in the original host. If there is more metadata to receive, the management agent continues to receive the SSD cache metadata. If the management agent receives an "ABANDON" or "TIMEOUT" alert, the management agent returns to active state 502. If all the data has been received or the VM has been powered on (i.e., VMotion completed), the management agent enters into a dirty data synchronization state 508, in which the management agent receives from the original host the dirty block list. If there is more data for the dirty block list to receive, the management agent stays in state 508. If at this time the management agent receives an "ABANDONMENT" or "TIMEOUT" alert, the management agent returns to active state 502. If all data for the dirty block list is received, the management agent enters a VMotion synchronization state 510 to resume receiving any SSD cache metadata that has been left off when the management agent stopped to receive the dirty block list in state 508. After all the data is received, or in response to receiving an "ABANDON" or "TIMEOUT" alert, the management agent returns to active 502.

Figure 6:
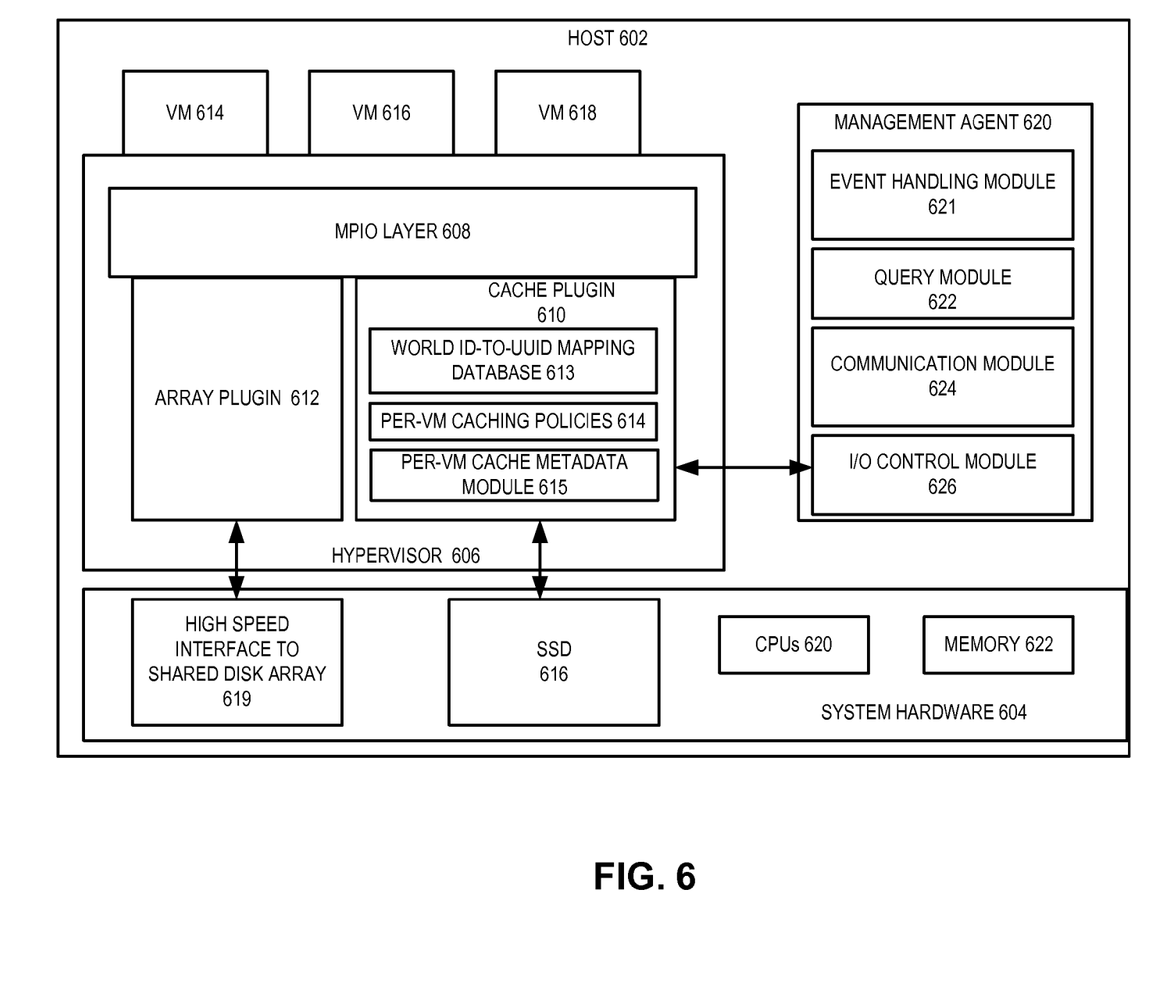
FIG. 6 illustrates an exemplary computer system that facilitates live migration of a VM-granular I/O cache, in accordance with one embodiment.

FIG. 6 illustrates an exemplary computer system that facilitates live migration of a VM-granular I/O cache, in accordance with one embodiment and as generally previously discussed. In the system illustrated in FIG. 6, a host 605 includes a set of system hardware 604, which includes a set of CPUs 620, memory 622, an SSD 616 serving as a second-level cache and a high speed interface 619 to a shared disk array. Host 602 also includes a hypervisor 606, which is responsible for starting, managing, and shutting down VMs. Hypervisor 606 manages a number of VMs 614, 616, and 618. Furthermore, in the embodiment of FIG. 6, hypervisor 606 includes an MPIO layer 608, which, as previously discussed couples to a cache plugin 610 (e.g., corresponding to cache module 110) and an array plugin 612. Cache plugin 610 includes a world ID-to-UUID mapping table or database 613, a set of per-VM caching policies 614, and a per-VM cache metadata module 615. Host 602 also includes a software management agent 620 running in the "user world," as previously discussed. Management agent 620 includes an event handling module 621, a query module 622, a communication module 624, and an I/O control module 626.

During operation, event handling module 621 monitors VM related events, such as power-on, shut-down and migrate. Upon a VM's power-on, event handling module 621 receives the corresponding power-on event and passes the VM's UUID to query module 622. Query module 622 in turn queries hypervisor 606 with the UUID and obtains all the world IDs for that VM. I/O control module 626 subsequently communicates the VM world ID-to-UUID mapping to cache plugin 610 (e.g., via IOCTL), which saves the mapping relationship in its world ID-to-UUID mapping database 613. In addition, communication module 624 in management agent 620 communicates with a global caching policy manager and obtains VM-specific caching policies that specify, for example, an amount of space in SSD 616 to allocate as a cache for a VM. Management agent 620 then communicates such policies to cache plugin 610 (e.g., via IOCTL). As a result, cache plugin 610 maintains the per-VM caching policies 614. Cache plugin 610 performs the I/O operations, such as the processes depicted in FIGS. 4 and 5.

During a VMotion process (say, for VM 618), if host 602 is the original host, upon receiving a pre-VMotion alert, per-VM cache metadata module 615 provides the current set of SSD cache metadata for VM 618 to management agent 620. Management agent 620 in turn sends this SSD cache data to the destination host via communication module 624. Meanwhile, per-VM cache metadata module 615 maintains a dirty block list. Upon receiving a VM POWER OFF signal (i.e., when VM 618 is stunned), communication module 624 temporarily suspends the transmission of VM 618's SSD cache metadata, and transmits the dirty block list to the destination host. After the dirty block list is successfully transmitted, communication module 624 resumes transmission of the rest of the SSD cache metadata, if there is any left.

If host 602 is the destination host, upon receiving a pre-VMotion alert, communication module 624 starts receiving the SSD cache metadata sent by the original host. Management agent 620 subsequently passes this metadata to per-VM cache metadata module 615 via IOCTL module 626. Meanwhile, based on the received metadata, cache plugin 610 starts pre-fetching the data blocks from shared disk array via high speed interface 619 and array plugin 612, and stores the pre-fetched data blocks in SSD 616. When management agent 620 receives a POWER ON event for VM 618, which indicates that the VMotion is complete, communication module 624 stops receiving the SSD cache metadata, and starts receiving the dirty block list. After the dirty block list is received, cache plugin 610 invalidates the pre-fetched blocks in SSD 616 based on the dirty block list. Subsequently, cache plugin 610 places the cache in SSD 616 in service for VM 618. Furthermore, communication module 624 continues to receive the rest of the SSD cache metadata, if there is any that is left from the prior transmission.

In summary, embodiments of the present invention provide a system and method for facilitating live migration of SSD based VM-granular I/O cache. During operation, when an original host receives a pre-VMotion alert, the original host transmits a copy of the metadata for the VM-granular SSD cache. This metadata indicates the data blocks stored in the SSD cache for the VM that is being migrated. When receiving this metadata, the destination host can start pre-fetching the data blocks specified in the metadata from a shared storage disk via high speed links to the shared storage. When the VMotion is complete and VM on the destination host is powered on, the original host transmits a dirty block list to the destination host. This dirty block list indicates the data blocks in the SSD cache that has changed since the transmission of the metadata. In response, the destination host invalidates the pre-fetched blocks specified by the dirty block list, and places the local SSD cache in service for the newly migrated VM. Furthermore, the destination host can continue to receive the SSD cache metadata and pre-fetching the blocks based on the metadata, if transmission of the metadata could not be completed when the VM is powered on at the destination host.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The foregoing descriptions of embodiments of the present invention have been presented only for purposes of illustration and description. They are not intended to be exhaustive or to limit this disclosure. Accordingly, many modifications and variations will be apparent to practitioners skilled in the art. For example, while certain functions have been described as taking place within a cache module or management agent, it should be recognized that any of these functions may be implemented in either of the cache module or the management agent in alternative embodiments and that even other embodiments may implement all the functions within one component or several other components. The scope of the present invention is defined by the appended claims.

What is claimed is:

1. A method for migrating virtual machine (VM)-specific content cached in a first solid state drive (SSD) attached to an original host, the method comprising:
   receiving an event indicating an upcoming migration of a VM to a destination host, wherein the migration includes an indication the VM will be powered off;
   transmitting a set of metadata associated with the first SSD cache to the destination host, wherein the set of metadata indicates a number of data blocks stored in the first SSD cache, thereby allowing the destination host to pre-fetch data blocks specified in the set of metadata from a storage shared by the original host and the destination host for storing in a second SSD cache for the destination host, wherein pre-fetch of the data blocks occurs before the indication the VM will be powered off occurs;
   receiving the indication the VM will be powered off; and
   transmitting a dirty block list to the destination, wherein:
   the dirty block list specifies one or more data blocks that have changed on the first SSD cache since the transmission of the set of metadata, and
   the destination host uses the dirty block list to invalidate one or more pre-fetched blocks in the second SSD cache.

2. The method of claim 1, further comprising:
   maintaining the dirty block list subsequent to transmitting the set of metadata associated with the first SSD cache.

3. The method of claim 1, further comprising suspending the transmission of the set of metadata associated with the first SSD cache in response to receiving the indication the VM will be powered off.

4. The method of claim 3, further comprising resuming transmission of the set of metadata associated with the first SSD subsequent to transmitting the dirty block list.

5. A method for migrating virtual machine (VM)-specific content cached in a first solid state drive (SSD) attached to an original host computer, the method comprising:
- receiving an event indicating an upcoming migration of a VM to a destination host, wherein the event includes an indication the VM will be powered off;
- receiving a set of metadata associated with the first SSD cache from the original host, wherein the set of metadata indicates a number of data blocks stored in the first SSD cache for storing in a second SSD cache for the destination host, wherein pre-fetch of the data blocks occurs before the indication the VM will be powered off occurs;
- pre-fetching data blocks specified in the set of metadata from a storage shared by the original host and the destination host;
- storing the pre-fetched data blocks in a second SSD cache attached to the destination host;
- receiving a dirty block list, wherein the dirty block list specifies one or more data blocks that have changed on the first SSD cache since the transmission of the set of metadata, and
- using the dirty block list to invalidate one or more pre-fetched blocks in the second SSD cache.

6. The method of claim 5, further comprising:
- receiving an indication the VM will be powered on at the destination host;
- in response to the indication the VM will be powered on receiving the dirty block list from the original host; and
- invalidating the one or more pre-fetched blocks based on the dirty block list.

7. The method of claim 6, further comprising:
- subsequent to invalidating the one or more pre-fetched blocks, placing the second SSD cache attached to the destination host in service for the newly migrated VM.

8. The method of claim 6, further comprising:
- subsequent to receiving the dirty block list, resuming the receiving of the set of metadata from the original host.

9. The method of claim 5, further comprising:
- receiving multiple sets of SSD cache metadata which are associated with a number of migrating VMs; and
- pre-fetching data blocks specified by the multiple sets of SSD cache metadata based on each set of metadata's corresponding cache hit rate.

10. The method of claim 5, further comprising:
- discontinuing pre-fetching the data blocks in response to a timeout event or a size limit being reached.

11. A non-transitory storage medium storing instructions which when executed by one or more processors cause the one or more processors to perform a method for migrating virtual machine (VM)-specific content cached in a solid state drive (SSD) attached to an original host, the method comprising:
- receiving an event indicating an upcoming migration of a VM to a destination host, wherein the migration includes an indication the VM will be powered off;
- transmitting a set of metadata associated with the first SSD cache to the destination host, wherein the set of metadata indicates a number of data blocks stored in the first SSD cache, thereby allowing the destination host to pre-fetch data blocks specified in the set of metadata from a storage shared by the original host and the destination host for storing in a second SSD cache for the destination host, wherein pre-fetch of the data blocks occurs before the indication the VM will be powered off occurs;
- receiving the indication the VM will be powered off; and
- transmitting a dirty block list to the destination, wherein:
  - the dirty block list specifies one or more data blocks that have changed on the first SSD cache since the transmission of the set of metadata, and
  - the destination host uses the dirty block list to invalidate one or more pre-fetched blocks in the second SSD cache.

12. The non-transitory storage medium of claim 11, wherein the method further comprises:
- maintaining the dirty block list subsequent to transmitting the set of metadata associated with the first SSD cache.

13. The non-transitory storage medium of claim 11, wherein the method further comprises suspending the transmission of the set of metadata associated with the first SSD cache in response to receiving the indication the VM will be powered off.

14. The non-transitory storage medium of claim 13, wherein the method further comprises resuming transmission of the set of metadata associated with the first SSD subsequent to transmitting the dirty block list.

15. A non-transitory storage medium storing instructions which when executed by one or more processors cause the one or more processors to perform a method for migrating virtual machine (VM)-specific content cached in a solid state drive (SSD) attached to an original host computer, the method comprising:
- receiving an event indicating an upcoming migration of a VM to a destination host, wherein the event includes an indication the VM will be powered off;
- receiving a set of metadata associated with the first SSD cache from the original host, wherein the set of metadata indicates a number of data blocks stored in the first SSD cache for storing in a second SSD cache for the destination host, wherein pre-fetch of the data blocks occurs before the indication the VM will be powered off occurs;
- pre-fetching data blocks specified in the set of metadata from a storage shared by the original host and the destination host;
- storing the pre-fetched data blocks in a second SSD cache attached to the destination host;
- receiving a dirty block list, wherein the dirty block list specifies one or more data blocks that have changed on the first SSD cache since the transmission of the set of metadata, and
- using the dirty block list to invalidate one or more pre-fetched blocks in the second SSD cache.

16. The non-transitory storage medium of claim 15, wherein the method further comprises:
- receiving an indication the VM will be powered on at the destination host;
  - in response to the indication the VM will be powered on, receiving the dirty block list from the original host; and
  - invalidating the one or more pre-fetched blocks based on the dirty block list.

17. The non-transitory storage medium of claim 16, wherein the method further comprises:
- subsequent to invalidating the one or more pre-fetched blocks, placing the second SSD cache attached to the destination host in service for the newly migrated VM.

18. The non-transitory storage medium of claim 16, wherein the method further comprises:
- subsequent to receiving the dirty block list, resuming the receiving of the set of metadata from the original host.

19. The non-transitory storage medium of claim 15, wherein the method further comprises:
- receiving multiple sets of SSD cache metadata which are associated with a number of migrating VMs; and pre-fetching data blocks specified by the multiple sets of SSD cache metadata based on each set of metadata's corresponding cache hit rate.

20. The non-transitory storage medium of claim 15, wherein the method further comprises:

discontinuing pre-fetching the data blocks in response to a timeout event or a size limit being reached.

\* \* \* \* \*